United States Patent
Metzler

(10) Patent No.: US 6,272,796 B1
(45) Date of Patent: Aug. 14, 2001

(54) MORTISE AND TENON JOINT FOR POST AND BEAM I-BEAMS COMPOSED OF FIBER REINFORCED PULTRUDED POLYMER COMPOSITE

(76) Inventor: Harold E. Metzler, 107 Oakdale Rd., Martinsburg, PA (US) 16662

( * ) Notice: Subject to any disclaimer, the term of this patent is extended or adjusted under 35 U.S.C. 154(b) by 0 days.

(21) Appl. No.: 09/476,167

(22) Filed: Dec. 30, 1999

(51) Int. Cl.⁷ .................................................. E04B 7/04
(52) U.S. Cl. .................. 52/93.1; 52/93.2; 52/263; 52/283; 52/309.1; 52/736.2; 403/403; 403/245
(58) Field of Search .................................. 52/92.2, 93.1, 52/93.2, 263, 283, 639, 650.1, 653.1, 655.1, 736.2, 737.1, 309.1; 403/403, 345, 256, 252, 245

(56) References Cited

U.S. PATENT DOCUMENTS

| | | | |
|---|---|---|---|
| 1,258,408 | * 3/1918 | Hill | 52/93.2 |
| 3,146,864 | * 9/1964 | Mystrom et al. | 52/93.2 |
| 3,706,169 | * 12/1972 | Rensch | 52/263 |
| 4,020,202 | 4/1977 | Kreft . | |
| 4,154,030 | 5/1979 | Huguet . | |
| 4,177,306 | 12/1979 | Schulz et al. . | |
| 4,342,177 | * 8/1982 | Smith | 52/93.1 |
| 4,384,802 | 5/1983 | Lo et al. . | |
| 4,797,020 | * 1/1989 | Winston | 403/231 |
| 5,577,353 | * 11/1996 | Simpson | 52/92.2 |
| 5,600,924 | * 2/1997 | Forsberg | 52/93.2 |
| 5,848,512 | 12/1998 | Conn . | |

\* cited by examiner

Primary Examiner—Beth A. Stephan
Assistant Examiner—Brian E. Glessner
(74) Attorney, Agent, or Firm—Richard L. Miller, P.

(57) ABSTRACT

A mortise and tenon joint for I-beam members. The joint includes an I-beam post and an I-beam beam that interlocks with the I-beam post. The I-beam post and the I-beam beam are each made of fiber reinforced pultruded polymer composite. The web of the I-beam post extends past the flanges of the I-beam post so as to form a tenon. The flanges of the I-beam beam have a pair of aligned throughslots so as to form a mortise that snugly receives, and is filled by, the tenon. The tenon has a plurality of throughbores through the pair of opposing faces thereof. The web of the I-beam beam has a plurality of throughbores that are aligned with the plurality of throughbores in the tenon when the tenon is snugly received in the mortise. Bolts extend through first washers, through the plurality of throughbores in the web of the I-beam beam, through the plurality of throughbores in the tenon, through second washers, and threadably engage in nuts so as to maintain the tenon in the mortise.

7 Claims, 1 Drawing Sheet

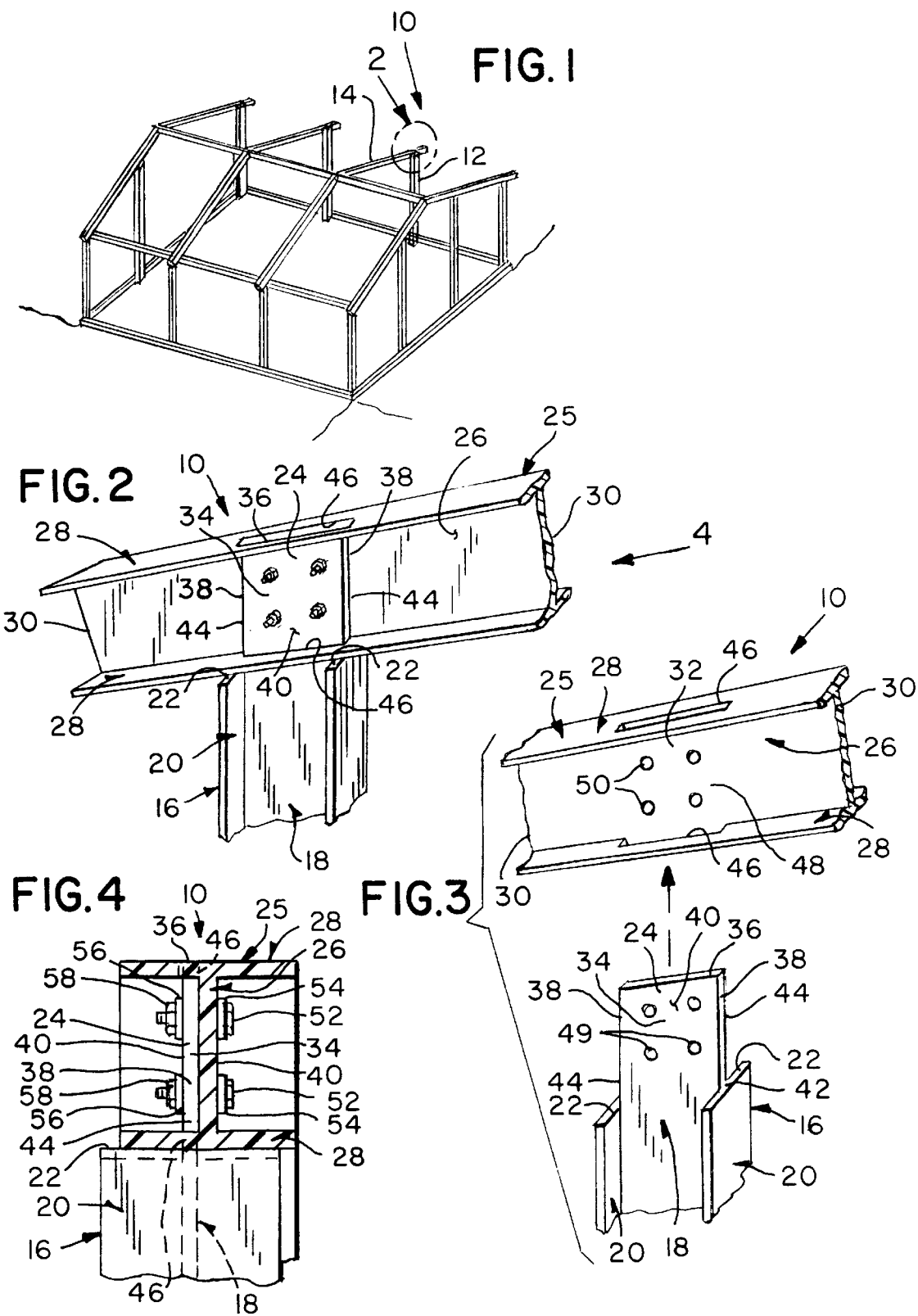

MORTISE AND TENON JOINT FOR POST AND BEAM I-BEAMS COMPOSED OF FIBER REINFORCED PULTRUDED POLYMER COMPOSITE

BACKGROUND OF THE INVENTION

1. Field of the Invention

The present invention relates to a mortise and tenon joint. More particularly, the present invention relates to a mortise and tenon joint for post and beam I-beams composed of fiber reinforced pultruded polymer composite.

2. Description of the Prior Art

Numerous innovations for structural members have been provided in the prior art that will be described. Even though these innovations may be suitable for the specific individual purposes to which they address, however, they differ from the present invention.

A FIRST EXAMPLE, U.S. Pat. No. 4,020,202 to Kreft teaches a beam and strut girder for use in vehicles and in other constructions which comprises a girder construction consisting of a fiber reinforced plastic material.

A SECOND EXAMPLE, U.S. Pat. No. 4,154,030 to Huguet teaches a prefabricated building construction composed of a plurality of columns and beams adapted to be interconnected to one another to form a rigid load-bearing structural frame and a plurality of inexpensive lightweight non-load-bearing panels spanning the frame components, and each panel being generally of slab form and having a top, bottom and side faces bounding an inside and outside main generally planar face, and said panels comprising a main portion of molded waste material and a resinous binder forming a polymer and the minor portion of open cell material in spaced parallel cylindrical shafts embedded within the main portion of molded waste material with the shafts extending from the top surface to the bottom surface and one of said shafts being adjacent each of the side surfaces, said frame components being substantially concealed within the panels defining waterproof seams wherein the frame components serve as waterproof seams wherein the frame components serve as waterproof panel connectors, each frame component along one of the seams comprising a portion extending depthwise through the confronting side surfaces of adjacent panels and into the cylindrical embedded shafts of open cell material and having enlarged outer ends within the shafts of open cell material.

A THIRD EXAMPLE, U.S. Pat. No. 4,177,306 to Schulz et al. teaches laminated sectional girders having webs and flanges that may be formed to increase the shear stresses thereof by including as a structural part of the girder at least one connecting layer extending through both the flanges and webs of the girder and made of prefabricated sections with additional girder layers being arranged adjacent the sections of the connecting layer. The additional adjacent layers may comprise both fiber-reinforced material layers forming the laminated flanges of the girder as well as the webs thereof. The additional layers may be arranged either between prefabricated sections of the connecting layer or they may be arranged outside of the prefabricated sections.

A FOURTH EXAMPLE, U.S. Pat. No. 4,384,802 to Lo et al. teaches beams or girders composed of fiber-reinforced polymers or plastics that can be adhesively bonded into structural members by means of an interconnecting joint of such material having an arch structure which is positioned and arranged so that it provides a flexibility that tends to reduce peel failures of the adhesive bonds between the joint and beams or girders.

A FIFTH EXAMPLE, U.S. Pat. No. 5,848,512 to Conn teaches a structural member for use in securing a wallboard to an existing wall. The structural member is constructed a single piece of extruded plastic formed into an I-beam shape with a hollow center. The hollow center eases passage of a fastener mechanism, yet provides structural rigidity with the reinforcement by the fastener. Passage of water pipes and electrical wires transversely is possible by use of predefined spacer wall openings.

It is apparent that numerous innovations for structural members have been provided in the prior art that are adapted to used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a mortise and tenon joint for post and beam I-beams composed of fiber reinforced pultruded polymer composite that avoids the disadvantages of the prior art.

ANOTHER OBJECT of the present invention is to provide a mortise and tenon joint for post and beam I-beams composed of fiber reinforced pultruded polymer composite that is simple and inexpensive to manufacture.

STILL ANOTHER OBJECT of the present invention is to provide a mortise and tenon joint for post and beam I-beams composed of fiber reinforced pultruded polymer composite that is simple to use.

BRIEFLY STATED, YET ANOTHER OBJECT of the present invention is to provide a mortise and tenon joint for I-beam members. The joint includes an I-beam post and an I-beam beam that interlocks with the I-beam post. The I-beam post and the I-beam beam are each made of fiber reinforced pultruded polymer composite. The web of the I-beam post extends past the flanges of the I-beam post so as to form a tenon. The flanges of the I-beam beam have a pair of aligned throughslots so as to form a mortise that snugly receives, and is filled by, the tenon. The tenon has a plurality of throughbores through the pair of opposing faces thereof. The web of the I-beam beam has a plurality of throughbores that are aligned with the plurality of throughbores in the tenon when the tenon is snugly received in the mortise. Bolts extend through first washers, through the plurality of throughbores in the web of the I-beam beam, through the plurality of throughbores in the tenon, through second washers, and threadably engage in nuts so as to maintain the tenon in the mortise.

The novel features which are considered characteristic of the present invention are set forth in the appended claims. The invention itself, however, both as to its construction and its method of operation, together with additional objects are advantages thereof, will be best understood from the following description of the specific embodiments when read and understood in connection with the accompanying drawing.

DESCRIPTION OF THE DRAWING

The figures of the drawing are briefly described as follows:

FIG. 1 is a diagrammatic perspective view of the present invention in use joining an I-beam beam to an I-beam post;

FIG. 2 is a enlarged diagrammatic perspective view of the area generally enclosed in the dotted curve identified by arrow 2 in FIG. 1 of the present invention;

FIG. 3 is an exploded diagrammatic perspective view of the present invention shown in FIG. 2; and FIG. 4 is an enlarged diagrammatic end elevational view taken generally in the direction of arrow 4 in FIG. 2.

LIST OF REFERENCE NUMERALS UTILIZED IN THE DRAWING 10 mortise and tenon joint of the present invention for I-beam post 12 composed of fiber reinforced pultruded polymer composite and I-beam beam 14 composed of fiber reinforced pultruded polymer composite
12 I-beam post composed of fiber reinforced pultruded polymer composite
14 I-beam beam composed of fiber reinforced pultruded polymer composite
16 I-beam post
18 web of I-beam post 16
20 flanges of I-beam post 16
22 uppermost terminal edges of flanges 20 of I-beam post 16
24 uppermost terminal end of I-beam post 16
25 I-beam beam
26 web of I-beam beam 25
28 flanges of I-beam beam 25
30 pair of terminal ends of I-beam beam 25
32 intermediate point of I-beam beam 25
34 tenon on I-beam post 16
36 uppermost terminal edge of tenon 34 on I-beam post 16
38 terminal side edges of tenon 34 on I-beam post 16
40 pair of opposing faces of tenon 34 on I-beam post 16
42 pair of shoulders of tenon 34 on I-beam post 16
44 pair of cheeks of tenon 34 on I-beam post 16
46 pair of aligned throughslots in flanges 28 of I-beam beam 25
48 mortise in I-beam beam 25
49 plurality of throughbores in tenon 34 on I-beam post 16
50 plurality of throughbores in web 26 of I-beam beam 25
52 bolts
54 first washers
56 second washers
58 nuts

DESCRIPTION OF THE PREFERRED EMBODIMENT

Referring now to the figures, in which like numerals indicate like parts, and particularly to FIG. 1, the mortise and tenon joint of the present invention is shown generally at 10 for an I-beam post 12 composed of fiber reinforced pultruded polymer composite and an I-beam beam 14 composed of fiber reinforced pultruded polymer composite.

The configuration of the mortise and tenon joint 10 can best be seen in FIGS. 2–4, and as such, will be discussed with reference thereto.

The mortise and tenon joint 10 comprises an I-beam post 16 that has a web 18, flanges 20 that extend from opposite edges of the web 18 of the I-beam post 16 and have uppermost terminal edges 22, and an uppermost terminal end 24.

The mortise and tenon joint 10 further comprises an I-beam beam 25 that interlocks with the I-beam post 16, and has a web 26, flanges 28 that extend from opposite edges of the web 26 of the I-beam beam 25, a pair of terminal ends 30, and an intermediate point 32 that is disposed intermediate the pair of terminal ends 30 of the I-beam beam 25.

The I-beam post 16 and the I-beam beam 25 are each made of fiber reinforced pultruded polymer composite.

The web 18 of the I-beam post 16 extends past the flanges 20 of the I-beam post 16, at the uppermost terminal end 24 of the I-beam post 16, so as to form a tenon 34 with an uppermost terminal edge 36, terminal side edges 38, a pair of opposing faces 40, a pair of shoulders 42 that are disposed at the uppermost terminal edges 22 of the flanges 20 of the I-beam post 16, respectively, and a pair of cheeks 44 that are disposed at the terminal side edges 38 of the web 18 of the I-beam post 16, respectively.

The flanges 28 of the I-beam beam 25 have a pair of aligned throughslots 46 so as to form a mortise 48 that snugly receives, and is filled by, the tenon 34 on the I-beam post 16.

The pair of aligned throughslots 46 in the flanges 28 of the I-beam beam 25 are disposed at the intermediate point 32 of the I-beam beam 25, to one side of, and directly adjacent to, the web 26 of the I-beam beam 25.

One face 40 of the tenon 34 on the I-beam post 16 abuts directly against the web 26 of the I-beam beam 25, offsetting the I-beam beam 25 relative to the I-beam post 16.

The uppermost terminal edge 36 of the tenon 34 on the I-beam post 16 extends into an uppermost throughslot 46 in, and is flush with, an uppermost flange 28 of the I-beam beam 25.

The shoulders 42 of the tenon 34 on the I-beam post 16 abut directly against a lowermost flange 28 of, and support, the I-beam beam 25.

The cheeks 44 of the tenon 34 on the I-beam post 16 abut directly against the pair of aligned throughslots 46 in the I-beam beam 25.

The tenon 34 on the I-beam post 16 has a plurality of throughbores 49 through the pair of opposing faces 40 thereof.

The web 26 of the I-beam beam 25 has a plurality of throughbores 50 that are disposed between the pair of aligned throughslots 46 in the flanges 28 of the I-beam beam 25, and which are aligned with the plurality of throughbores 49 in the tenon 34 on the I-beam post 16 when the tenon 34 on the I-beam post 16 is snugly received in the mortise 48 in the I-beam beam 25.

The mortise and tenon joint 10 further comprises bolts 52 that extend through first washers 54, through the plurality of throughbores 50 in the web 26 of the I-beam beam 25, through the plurality of throughbores 49 in the tenon 34 on the I-beam post 16, through second washers 56, and threadably engage in nuts 58 so as to maintain the tenon 34 on the I-beam post 16 in the mortise 48 in the I-beam beam 25.

The uppermost terminal edge 36 of the tenon 34 on the I-beam post 16 is pitched when the I-beam beam 25 is used as a rafter.

The uppermost terminal edges 22 of the flanges 20 of the I-beam post 16 are at different elevations to match the pitch of the uppermost terminal edge 36 of the tenon 34 on the I-beam post 16 when the I-beam beam 25 is used as a rafter.

It will be understood that each of the elements described above, or two or more together, may also find a useful application in other types of constructions differing from the types described above.

While the invention has been illustrated and described as embodied in a mortise and tenon joint for post and beam I-beams composed of fiber reinforced pultruded polymer composite, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A mortise and tenon joint for I-beam members, comprising:
   a) an I-beam post having:
      i) a web;
      ii) flanges extending from opposite edges of said web of said I-beam post and having uppermost terminal edges; and
      iii) an uppermost terminal end; and
   b) an I-beam beam interlocking with said I-beam post and having:
      i) a web;
      ii) flanges extending from opposite edges of said web of said I-beam beam;
      iii) a pair of terminal ends; and
      iv) an intermediate point disposed intermediate said pair of terminal ends of said I-beam beam;
   wherein said web of said I-beam post extends past said flanges of said I-beam post, at said uppermost terminal end of said I-beam post, so as to form a tenon with:
      a) an uppermost terminal edge;
      b) terminal side edges;
      c) a pair of opposing faces;
      d) a pair of shoulders that are disposed at said uppermost terminal edges of said flanges of said I-beam post, respectively; and
      e) a pair of cheeks disposed at said terminal side edges of said web of said I-beam post, respectively;
   wherein said flanges of said I-beam beam have a pair of aligned throughslots so as to form a mortise that snugly receive, and are filled by, said tenon on said I-beam post;
   wherein said pair of aligned throughslots in said flanges of said I-beam beam are disposed at said intermediate point of said I-beam beam, to one side of, and directly adjacent to, said web of said I-beam beam;
   wherein one face of said tenon on said I-beam post abuts directly against said web of said I-beam beam, offsetting said I-beam beam relative to said I-beam post;
   wherein said uppermost terminal edge of said tenon on said I-beam post extends into an uppermost throughslot in, and is flush with, an uppermost flange of said I-beam beam;
   wherein said uppermost terminal edge of said tenon on said I-beam post is pitched when said I-beam beam is used as a rafter; and
   wherein said uppermost terminal edges of said flanges of said I-beam post are at different elevations to match said pitch of said uppermost terminal edge of said tenon on said I-beam post when said I-beam beam is used as the rafter.

2. The joint as defined in claim 1, wherein said I-beam post and said I-beam beam are each made of fiber reinforced pultruded polymer composite.

3. The joint as defined in claim 1, wherein said shoulders of said tenon on said I-beam post abut directly against a lowermost flange of, and support, said I-beam beam.

4. The joint as defined in claim 1, wherein said cheeks of said tenon on said I-beam post abut directly against said pair of aligned throughslots in said I-beam beam.

5. The joint as defined in claim 1, wherein said tenon on said I-beam post has a plurality of throughbores through said pair of opposing faces thereof.

6. The joint as defined in claim 5, wherein said web of said I-beam beam has a plurality of throughbores that are disposed between said pair of aligned throughslots in said flanges of said I-beam beam, and which are aligned with said plurality of throughbores in said tenon on said I-beam post when said tenon on said I-beam post is snugly received in said mortise in said I-beam beam.

7. The joint as defined in claim 6; further comprising bolts that extend through first washers, through said plurality of throughbores in said web of said I-beam beam, through said plurality of throughbores in said tenon on said I-beam post, through second washers, and threadably engage in nuts so as to maintain said tenon on said I-beam post in said mortise in said I-beam beam.

* * * * *